May 19, 1942.  F. M. OWNER  2,283,284
CHANGE-SPEED GEARING
Filed Dec. 5, 1940  2 Sheets-Sheet 1

Inventor
Frank Morgan Owner
by Wilkinson & Mawhinney
Attorneys.

May 19, 1942.  F. M. OWNER  2,283,284
CHANGE-SPEED GEARING
Filed Dec. 5, 1940  2 Sheets-Sheet 2

Inventor
Frank Morgan Owner
by Wilkinson & Mawhinney
Attorneys.

Patented May 19, 1942

2,283,284

UNITED STATES PATENT OFFICE 2,283,284

CHANGE-SPEED GEARING

Frank Morgan Owner, Bristol, England, assignor to The Bristol Aeroplane Company Limited, Bristol, England, a British company Application December 5, 1940, Serial No. 368,729
In Great Britain November 14, 1939

5 Claims. (Cl. 74—260)

This invention relates to change-speed gearing such as may be used for driving the blower of a supercharged internal-combustion engine. The objects and advantages of the invention will appear hereinafter.

According to one feature of the invention, epicyclic change-speed gearing comprises two co-axial gears of which one constitutes the driven element of the train, means operable at will to lock the other gear against rotation so that it constitutes the abutment, one or more planet-wheels meshing with both said gears, a planet-carrier constituting the driving element of the train, and means operated automatically upon rotation of said abutment to clutch it to another element of the gear-train so that, when the abutment is released, the relative motion between the elements of the gear ceases. The said automatic means is preferably constituted by one or more masses carried by the abutment and movable automatically by centrifugal force into clutching engagement with the said other element. The said abutment is preferably a sun-wheel and the said driven element is a surrounding annular gear. The said centrifugal masses which are carried by the sun-wheel preferably enter into clutching engagement with a part of the planet-carrier.

According to another feature of this invention, the locking means for the abutment element aforesaid may be an hydraulically controlled brake whereof one member is stationary and the other is rotatably engaged with the abutment element.

According to another feature of the invention, change-speed gearing, for driving the blower of a supercharged internal-combustion engine, of the kind in which the gear-ratio is changed by arresting or releasing an element of the gear-train, comprises a hydraulically-actuated brake of which the cylinder and piston are non-rotatable and of which one brake-member, or set of brake-members is connected to said element.

In the accompanying drawings—

Like reference characters indicate like parts in both figures.

Figure 1:
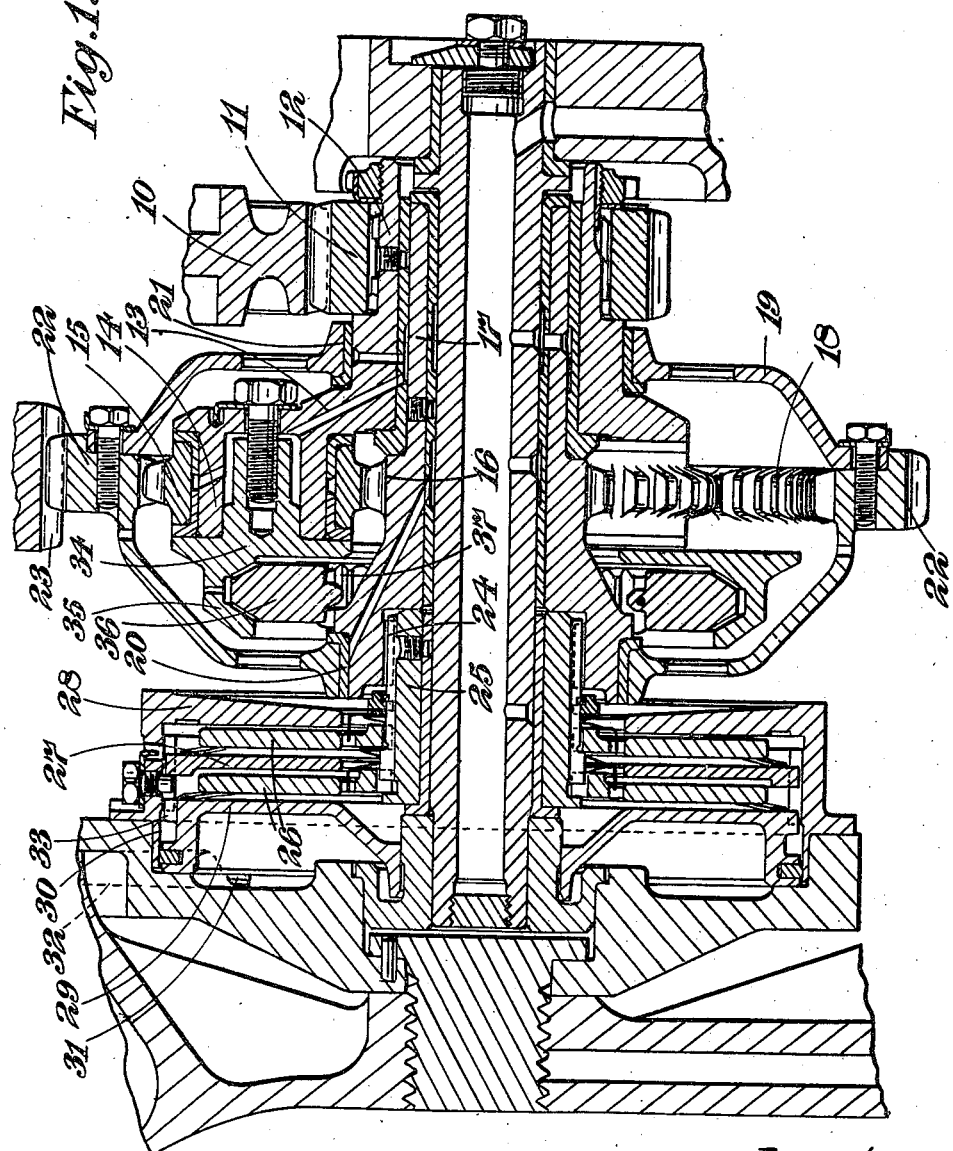
Figure 1 is a central sectional elevation of a change-speed gear.

Referring first to Figure 1, the drive is imparted to the change-speed gear by a gear-wheel indicated at 10, this wheel engaging a pinion 11 splined on a hollow shaft 12, one end of which is formed with a triangular plate-like member 13 constituting a planet-carrier. At each of three symmetrically disposed points in this plate 13 there is formed a boss 14 upon which there is rotatably mounted a planet-wheel 15. The three planet-wheels mesh with a central sun-wheel 16 formed on a hollow shaft 17 which is rotatable within the shaft 12 aforesaid, and the planets 15 also mesh with an internal gear 18, hereinafter termed the annulus, formed on the inside wall of a casing 19. This casing is rotatable by means of bearings 20, 21 on the shafts 12 and 17, respectively. The outside of the casing carries a gear 22 which meshes with a pinion 23 which is on the driven shaft of the complete gear-train.

The shaft 17 at its left-hand end, is internally splined at 24 to engage a sleeve 25 which also carries on its splines one or more plates 26, two plates being shown in this instance, and between these two plates there is mounted a fixed plate 27 carried in a stationary housing 28. The plate 27 is castellated so as to be non-rotatable in the housing 28, and the mountings of these plates enables them to be moved axially to effect braking and releasing, as desired. This brake is controlled by means of a piston 29 movable in a cylinder 30 carried by the housing 28 by hydraulic pressure admitted through the port 31 communicating with a supply conduit 32. Since the housing and cylinder are non-rotatable it is preferable that the piston 29 should also be non-rotatable and it is arranged, therefore, to engage the castellations in the housing as shown at 33.

The planet-carrier 13 carries on the bosses 14 an annular plate-like member 34 which is provided on one side with a ring 35 formed with an inwardly-directed groove of tapering cross-section which constitutes the outer member of a centrifugal friction clutch. The clutch-members 36 to co-operate with the ring 35 are constituted by masses 36 of complementary shape which are secured by springs 37 or other yielding means to the shaft 17 of the sun-wheel 16. Thus, when the sun-wheel 16 rotates, the masses 36 are subject to centrifugal force and thereby move outwards into frictional engagement with the member 35, and when the requisite speed is obtained the sun-wheel 16 is thereby clutched to the member 35 and to the planet-carrier 13 and the shaft 12.

This train of gearing operates in the following manner. When the higher gear-ratio is required, the hydraulically-controlled brake 26, 27 is engaged by admitting oil under pressure to the cylinder 30 so that the sun-wheel 16 is held stationary. The drive is thereby transmitted from the wheel 10 to the pinion 11, shaft 12 and planet-carrier 13, so that the planet-wheels 15 are rotated bodily and caused to roll on the stationary sun-wheel 16. The annulus 18 on the casing 19 is thereby driven and transmits the drive through the external gear 22 to the driven shaft 23, and it will be appreciated that the direction of rotation of the gear 22 is the same as that of the pinion 11.

When the lower gear-ratio is required, the hydraulic brake 26, 27 is disengaged by relieving the oil-pressure in the cylinder 30. There is, therefore, no restraint on movement of the sun-wheel 16, so that it tends to rotate with the planet-carrier and planet-wheels. Immediately, however, on the occurrence of such rotation, the centrifugal masses 36 are forced outwardly into engagement with the co-operating clutch-member 35, thereby clutching the sun-wheel 16 to the planet-carrier. It will be appreciated that this engaging action of the clutch 36, 35 is rapidly progressive, since the engagement of the clutch tends to increase the speed of the sun-wheel 16.

When the clutch is fully engaged, the pinion 11, shaft 12, planet-carrier 13, sun-wheel 16, planets 14, annulus 18, casing 19 and gear 22 are all locked together to rotate as one, transmitting a drive at a lower speed to the driven member 23.

When it is desired to revert to the higher speed, the re-engagement of the brake members 26, 27 retards the rotation of the sun-wheel 16 until it is stationary, when the clutch 35, 36 is completely disengaged, and it will be seen that this action also is a progressive one, since the retardation of the sun-wheel diminishes the pressure between the clutch-members 35, 36 and thereby diminishes the driving torque exerted on it.

Figure 2:
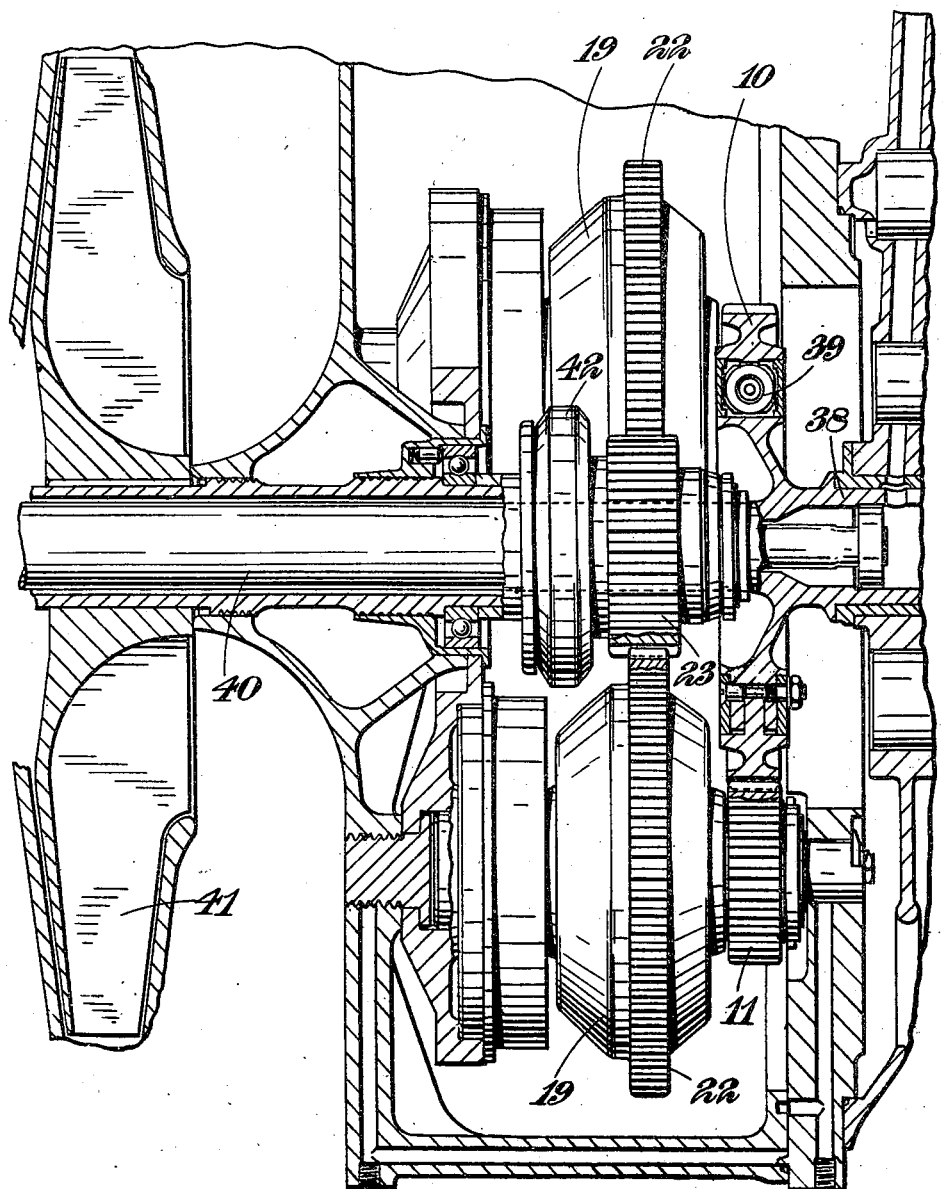
Figure 2 is a view partly in section showing the application of the epicyclic change-speed gear to the supercharger of an internal-combustion engine.

This invention also includes the application of a change-speed gear as above described for driving the supercharger of an internal-combustion engine and this particular application of it is illustrated in Figure 2.

A drive is taken from the engine crankshaft by the shaft 38 through a resilient coupling 39 to the gear-wheel 10 (see also Figure 1) and this wheel drives preferably three change-speed units, as illustrated in Figure 1, by their pinions 11 which are spaced uniformly around the gear 10. The casings 19 for two of these units are shown in Figure 2 and their external gears 22 drive a centrally disposed wheel 23 (see also Figure 1) which is connected to the shaft 40 of the impeller 41 of a centrifugal blower, either directly or through a slipping clutch 42.

As applied to an internal-combustion engine supercharger drive, this invention presents a great advantage in that the hydraulic cylinder is stationary. It is found that rotating hydraulic clutch and brake units which use lubricating oil as the pressure liquid have the effect of separating solid particles from the oil by centrifugal force and such solid particles clog the mechanism and other parts. The brake-plates are preferably not immersed in the oil but are disposed on one side of the piston, the oil-pressure being applied to the other face.

A further advantage of the invention is that, when the brake is disengaged so as to bring the lower ratio into action, the speed of the impeller falls gradually to the speed corresponding to the lower ratio without ever falling below this speed. It will be seen that the gear-ratio falls as the sun-wheel accelerates until the centrifugal clutch is firmly engaged. The sun-wheel cannot overrun the planet-carrier.

Moreover, no one-way clutch or free-wheel device is necessary.

I claim:

1. In an epicyclic change-speed gear, a shaft, a sun gear rotatably mounted on said shaft, a planet carrier rotatably mounted on said shaft, planet wheels mounted for rotation on the planet carrier and engaging said sun gear, a centrifugal clutch mechanism to operatively connect and disconnect the sun gear and planet carrier and operated by rotation of the sun gear to interlock the said sun gear and planet carrier, releasable means to lock the sun gear to the shaft, a ring gear rotatably mounted on said shaft and having internal and external teeth, said internal teeth being in engagement with the planet gears, a pinion engaging the external teeth on said ring gear, and means to rotate said planet carrier.

2. In an epicyclic change-speed gear, a shaft, a sun gear rotatably mounted on said shaft, a planet carrier mounted for rotation on said shaft, planet wheels mounted for rotation on the planet carrier and engaging said sun gear, a centrifugal clutch mechanism to operatively connect and disconnect the sun gear and planet carrier and operated by rotation of the sun gear to interlock the sun gear and planet carrier, a casing rotatably mounted on said shaft and enclosing the sun gear, planet carrier and centrifugal clutch, gear teeth disposed on the inner periphery of the casing and engaging the planet wheels, gear teeth on the outer periphery of the casing to form a ring gear, releasable means to lock the sun gear to the shaft, means to rotate the planet carrier, and a driven gear engaging the gear teeth on the outer periphery of the casing.

3. In an epicyclic change-speed gear, a shaft, a sun gear rotatably mounted on said shaft, a planet carrier mounted for rotation on said shaft, planet wheels mounted for rotation on the planet carrier and engaging said sun gear, a centrifugal clutch mechanism to operatively connect and disconnect the sun gear and planet carrier and operated by rotation of the sun gear to interlock the sun gear and planet carrier, a casing rotatably mounted on said shaft and enclosing the sun gear, planet carrier and centrifugal clutch, gear teeth disposed on the inner periphery of the casing and engaging the planet wheels, gear teeth on the outer periphery of the casing to form a ring gear, releasable means to lock the sun gear to the shaft, means to rotate the planet carrier, and a driven gear engaging the gear teeth on the outer periphery of the casing, said releasable means comprising a hydraulically controlled brake mechanism having a stationary member cooperating with a second member engaging said sun gear for rotation therewith.

4. In an internal combustion engine having a supercharger mounted on a rotatable shaft and adapted to be driven by the engine crankshaft, a driving gear wheel operatively connected to said crankshaft to be rotated thereby, a driven gear operatively connected to said supercharger shaft, and a plurality of epicyclic change-speed gear units operatively connecting said driving gear wheel to said driven gear wheel, each of said change-speed gear units comprising a shaft, a sun gear rotatably mounted on said shaft, a planet carrier mounted for rotation on said shaft, planet wheels mounted for rotation on said planet carrier and engaging the sun gear, a centrifugal clutch mechanism to operatively connect and disconnect the sun gear and planet carrier and operated by rotation of the sun gear to interlock the sun gear and planet carrier, a casing rotatably mounted on said shaft and enclosing the sun gear, planet carrier and centrifugal clutch mechanism, gear teeth disposed on the inner periphery of the casing and engaging the planet wheels, gear teeth on the outer periphery of the casing forming a ring gear, a gear mounted for rotation on said shaft exteriorly of the casing and secured to said planet carrier for rotation therewith, said gear meshing with the driving gear on the crankshaft, said external ring gear on the casing meshing with said driven gear on the supercharger shaft, and releasable means to hold the sun gear against rotation and operable at will to release said sun gear to permit it to rotate with the planet carrier.

5. In an epicyclic change speed gear train, the combination of two co-axial gears, one of which constitutes the driven element of the train, a hydraulically operated brake having a non-rotatable cylinder and brake members therein operable at will to lock the other gear against rotation so that it constitutes the abutment element of the train in its high speed gear ratio, one or more planet wheels meshing with both said gears, a planet carrier constituting the driving element of the train, and means operated automatically by the rotation of said abutment element to clutch it to another element of said train in its low speed ratio.

FRANK MORGAN OWNER.